(12) United States Patent
Colaiacomo et al.

(10) Patent No.: US 8,103,911 B2
(45) Date of Patent: Jan. 24, 2012

(54) METHOD AND SYSTEM FOR DISASTER RECOVERY BASED ON JOURNAL EVENTS PRUNING IN A COMPUTING ENVIRONMENT

(75) Inventors: Giovanni L. Colaiacomo, Rome (IT); Giuseppe Longobardi, Castellammare di Stabia (IT); Valeria Perticara, Rome (IT); Ilaria Rispoli, Rome (IT)

(73) Assignee: International Business Machines Corporation, Armonk, NY (US)

(*) Notice: Subject to any disclaimer, the term of this patent is extended or adjusted under 35 U.S.C. 154(b) by 318 days.

(21) Appl. No.: 12/180,477

(22) Filed: Jul. 25, 2008

(65) Prior Publication Data
US 2010/0023805 A1 Jan. 28, 2010

(51) Int. Cl.
*G06F 11/00* (2006.01)
(52) U.S. Cl. .......................................................... 714/20
(58) Field of Classification Search .................... 714/48, 714/15, 20; 707/648
See application file for complete search history.

(56) References Cited

U.S. PATENT DOCUMENTS

| | | | |
|---|---|---|---|
| 6,023,710 A | 2/2000 | Steiner et al. | |
| 6,158,019 A * | 12/2000 | Squibb | 714/13 |
| 6,351,754 B1 | 2/2002 | Bridge, Jr. et al. | |
| 6,678,704 B1 | 1/2004 | Bridge, Jr. et al. | |
| 6,993,537 B2 | 1/2006 | Buxton et al. | |
| 7,007,044 B1 | 2/2006 | Rafert et al. | |
| 7,051,244 B2 * | 5/2006 | Fisher et al. | 714/48 |
| 7,111,136 B2 | 9/2006 | Yamagami | |
| 7,162,601 B2 | 1/2007 | Yamagami | |
| 7,167,880 B2 | 1/2007 | Amano et al. | |
| 7,243,197 B2 | 7/2007 | Yamagami | |
| 7,565,661 B2 * | 7/2009 | Sim-Tang | 719/318 |
| 7,685,378 B2 * | 3/2010 | Arakawa et al. | 711/154 |
| 2007/0186068 A1 * | 8/2007 | Agrawal | 711/162 |
| 2011/0010581 A1 * | 1/2011 | Tanttu et al. | 714/11 |

* cited by examiner

*Primary Examiner* — Scott Baderman
*Assistant Examiner* — Yair Leibovich
(74) *Attorney, Agent, or Firm* — DeLizio Gilliam, PLLC

(57) ABSTRACT

A method and system for automated disaster recovery in an information technology computing system including computing resources, is provided. One implementation involves logging system events in a journaling log file, filtering the events of the log file for each resource and storing the filtered log file, reading the filtered log file, and restarting from a backup file by applying the filtered events to a backup file for recovery.

14 Claims, 4 Drawing Sheets

METHOD AND SYSTEM FOR DISASTER RECOVERY BASED ON JOURNAL EVENTS PRUNING IN A COMPUTING ENVIRONMENT

BACKGROUND OF THE INVENTION

1. Field of the Invention

The present invention relates generally to disaster recovery in a computing environment and more particularly to disaster recovery based on journaling events.

2. Background Information

In computer processing systems, application downtime results in financial losses for enterprises. While disaster recovery (DR) planning is one of the most critical tasks for administrators managing storage, databases, servers, virtual machines, it is the least automated and a fairly uncoordinated process, relying on error prone and suboptimal techniques.

Usually after a disaster or a severe system problem, there is an attempt to recover the systems and the applications in order to restart operations. This is based on the actions present in a disaster-recovery or service-restore prepared plan. The side effect is that a disruption of operations occurs and it may be too late to recover all the activity that was running at the time the problem occurred. Conventionally a checkpoint/journaling mechanism is use for tracking all the events from the last backup time. However, such a mechanism takes time to "reapply" each and all the events logged in the checkpoint/journal files, to again reach the final running state before the problem occurred.

SUMMARY OF THE INVENTION

The invention provides a method and system for automated disaster recovery in an information technology computing system including computing resources. One embodiment includes logging system events in a journaling log file, filtering the events of the log file for each resource and storing the filtered log file, reading the filtered log file, and restarting from a backup file by applying the filtered events to a backup file for recovery.

Restarting may further include reapplying the log file events to the system in order to recover the status before a failure/problem. Filtering the log file may further include using a meta-event language to identify a category of a logged event, and filtering the log file based on the event category, such that if an event is of a certain category, then maintaining a related complex event in the log file and pruning preceding events related to the said event from the log file.

Filtering the events of the log file may include filtering the events of the log file for each resource into a set of complex events using a meta-event language. Filtering the events of the log file may further include pruning the log file by creating a complex event from two or more simple events with event status connected with logical operators, creating complex events by processing prerequisites on different resources, and logically deleting said simple events.

Filtering the events of the log file may further include determining if the log file is to be filtered according to a criterion, if so, then performing merging and compacting on the log file. Performing merging and compacting on the log file may include reading events from the log file starting from a last event and proceeding backwards, checking in a composition rule repository to determine if a read event can be compacted, the composition rule repository including rules for compacting events, if the read event cannot be compacted, then saving the event, otherwise, if the read event can be compacted, then saving the event in the log file it has not been saved, and checking in the composition rule repository to determine if the read event is to be correlated with one of the saved events, if the read event is to be correlated, correlating the event with said one of the saved events, saving the correlated event in the log file and logically deleting said read event and said one of the saved events from the log file.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

Figure 1:
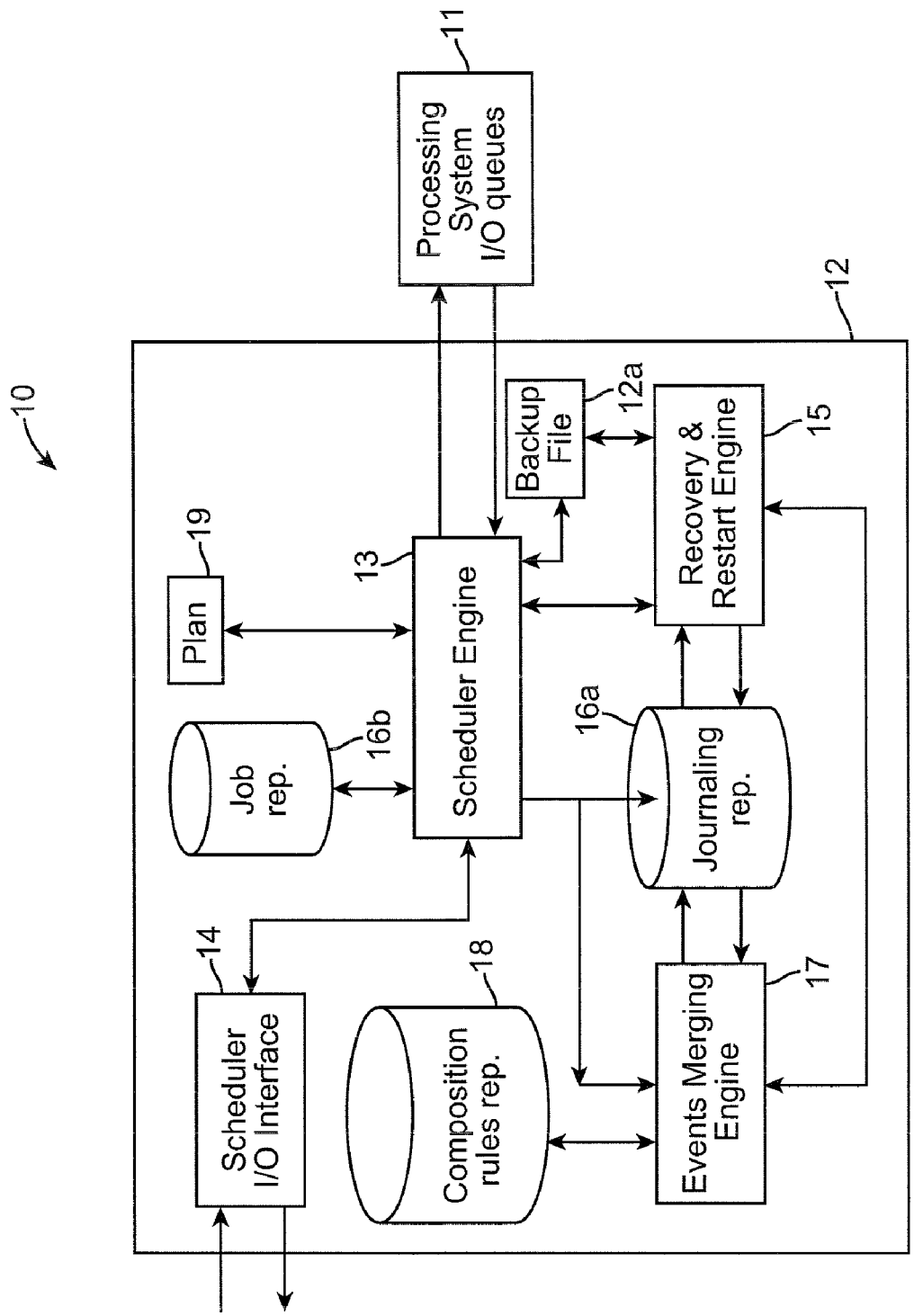
FIG. 1 shows a functional block diagram of a system implementing disaster recovery based on journaling events pruning in a computing environment, according to an embodiment of the invention.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The invention provides a method and system for disaster recovery based on journaling events pruning in a computing environment. One embodiment involves automated disaster recovery (DR) in an information technology computing environment including resources such as virtual machines, servers, interconnecting switches, storage systems, processors, etc. As the computing environment operates, periodically backup files are generated, and in between backups, events corresponding to the resources are logged in a log file (i.e., journaling repository). The log file is compacted/pruned in that events of the log file for each resource are filtered into a set of complex events using a meta-event language. Then, the filtered log file is read, and the filtered events are applied to a backup file and to any uncoupled resources, for recovery. The records present in the log file can be used by the computing environment to reprocess the same set of events that occurred since the last backup. The effect is to recreate in the computing environment the same status preceding the DR intervention. Having preventively filtered and compacted events in the log file improves the efficiency and the duration of the elaboration during the recovery phase, allowing a quick restart up after DR intervention. Filtering may include categorizing events as deleted, creating complex events with events status connected with logical operators and creating complex events by processing prerequisites on different resources. Certain events are logically connected with each other in a flow sequence (flow dependent events). If there has been an event logged, as part of a fixed sequence e.g., a status change to the next possible status in a prefixed order) it is sufficient to record that an intermediate change (the status change) has occurred and keep the latest event (most current status). There are also events depending one from the other in a hierarchic manner, and there are other events that depend on completion of a set of previous events. A unique complex event for a resource can keep track of the dependencies and different status of related events. Services are accordingly restored by avoiding processing of redundant log entries which can be determined based on the categorized log entries.

Since the event log entries are categorized (flow dependent/independent), this provides detection and immediate and appropriate event processing (i.e., avoiding processing redundant entries). The processes leverages complex event records created based on a meta language (including several flow dependent events), which allows reducing a journaling file size and speeds up processing of the journaling file at restore time.

In one implementation, the process provides improved restoring performances due to preventive events categorization, new complex event records, and redundant events pruning. For example, redundant events logged in the journaling/checkpointing files are not processed.

Typically, journaling logs include all the events that are related to resource updates (e.g., a database (DB) change or an application submission for execution). As such, if a problem occurs, conventionally the recovery involves obtaining the latest backup copy of the resource updates and applying all the journaling events to the last state of the resources before the problem occurred. However, in many cases there are events in the log related to a simple status change. In such cases, the invention only applies the latest status, rather than processing and passing through all of the status chain again. This reduces the required processing and provides a faster recovery phase.

The invention implements an efficient disaster recovery by providing a scheduling system that in one embodiment initially logs all the events in a journaling file. An operation that is part of the scheduling plan can have different status (e.g., arriving, ready, started, complete) and an event is logged for each status change. As the latest operation status is available, it provides the latest status change event for a resource. This avoids processing several events that will be over-written by other additional events a few instants later (i.e., avoids a processing chain that will process along all the status sequence). Further, certain events in the log are simply indicators of the final state, and are not needed for other work to proceed.

As an example, an application (job) has changing status (state), starting from "waiting", then transitioning to "submitted", then "executing" and finally either "successful" or "unsuccessful". Each state transition is journaled, but only the last state is meaningful for recovery and restoration. The preceding states can be logically erased from the journaling system.

As such, among the logged events, certain events are flow dependent while others are flow independent. For such flow independent events, only the last event for a specific resource is important for recovery purposes. A meta-event language (e.g., maintained by a composition rules repository) is utilized to identify a category (type) of the logged event, based on which a related pruning operation based on the event category is performed. This may be part of the definitions provided for a system and/or may be customizable by the user in deciding which event category to process (certain event categories may be relevant for auditing purposes, for example, while other event categories may not be). The definitions may be stored in an event table.

To identify the flow independent events based on the event table, the evaluation starts from the most recent event. If it is classified/categorized as flow independent, it will be processed, and all other preceding events related to the same operation will be ignored and not processed. This introduces logic for a journaling system which elaborates the last events and summarizes them with the existing ones. The previous outlined case (events where only the last one is meaningful) is the simplest case to handle, but more complex cases can also be considered using the meta-event language.

The meta-event language preferably combines the last event with the existing one, for the same resource, summarizing the two events into a single, more complex event. An existing event is related to a resource status change, logged for each status change, where only the last status reached by the resource is important and it is important to record only that the previous statuses were correctly completed. There is a set of existing/previous records read for a specific event category. The log is read and for a specific resource/event a new complex record is built, merging the needed previous record information with the last event information. Said last event and existing one can then be logically deleted from the log, and only said last event will need to be recovered if needed. As an example, consider the status of a workstation for which a first event was first journaled indicating placement of the workstation in "link" status. A second event is journaled indicating placement of the same workstation in "active" status. An events merging module uses the meta-data language to combine the two events into a single complex event that is journaled, wherein the single event indicates placement of the workstation in "active" AND "linked" status. The two individual events are logically deleted from the journal log.

The events meta-language preferably further processes prerequisites on different resources generating a single journaled event. The resulting journaled single event (which is logged and deletes all the preceding logged events) is used at restore time, wherein only this last event will need to be recovered. As such, flow dependent events can be handled with the meta-language wherein a restorable journal file comprises a reduced set of complex events (i.e., combination of multiple events) to be applied to uncoupled resources. This contributes to reducing the "restart phase" impact.

FIG. 1 shows a functional block diagram of a system 10 implementing disaster recovery based on journaling events pruning, according to an embodiment of the invention. The system 10 includes a processing system with I/O queues 11 and a recovery system 12. The recovery system 12 includes a scheduler engine 13, a scheduler I/O interface 14, a recovery and restart engine 15, a journaling repository 16a, a job repository 16b, an events merging engine 17, a composition rules repository 18, and a scheduling plan 19. The I/O interface 14 provides commands to the scheduler engine and receives notifications of the activity results.

The job repository 16b provides an activity (e.g., executing an application) for the scheduler engine 13 to schedule to be performed. The plan 19 is a repository of the scheduled (planned) activities that the scheduler engine 13 is execute on the processing system 11. The journaling repository 16a is a repository/DB that contains the scheduler activity event records (to be used in recovery/restart phase). The recovery and restart engine 15 is configured for restarting or recovery after failure.

The events merging engine 17 is configured for merging/compacting the journal events logged, to reduce redundancies and to improve recovery efficiency. The composition rules repository 18 is a repository that contains rules (meta-data language) followed by the merging engine 17 to compact the event records (e.g., "if there is a record of this type, the record of this other type may be deleted" and/or "if there is an event with this status, all the previous status events for the same resource may be deleted", etc.). The events merging engine 17 uses the meta-data language to combine events into a single complex event.

Figure 2:
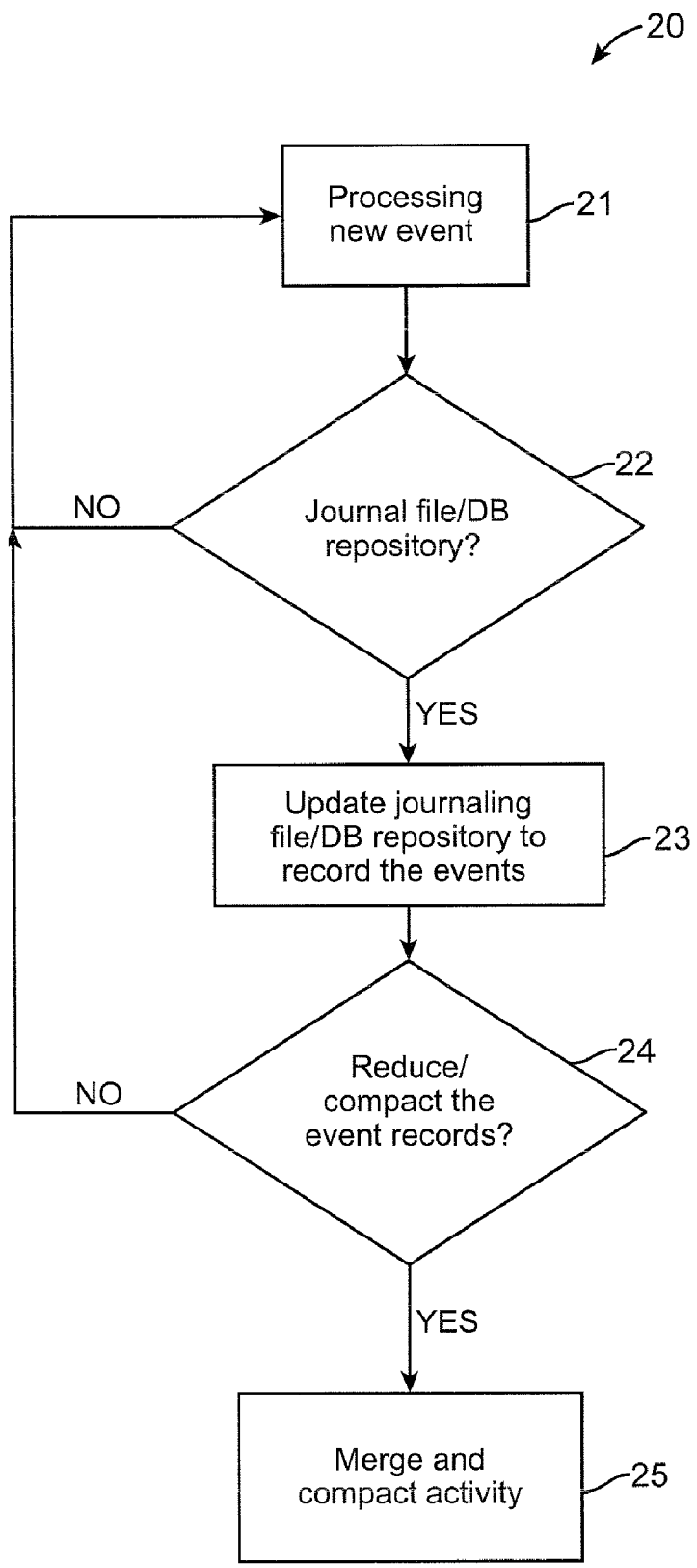
FIG. 2 shows a flowchart of a process for normal event logging operation in the system of FIG. 1, according to an embodiment of the invention.

FIG. 2 shows a flowchart of a normal activity process 20 for the system 10, according to an embodiment of the invention. As the computing environment operates, periodically backup files 12*a* are generated, and in between backups, events corresponding to the resources are logged in the log file (i.e., journaling repository 16*a*). In processing block 21, new events are processed. In block 22, it is checked if an event must be journaled. If so, the process proceeds to block 23, otherwise the process proceeds to block 21 to process a next new events. In block 23, the journaling repository 16*a* is updated wherein the new events is recorded (journaled) in the journaling repository 16*a*. The scheduler engine records events in the repository 16*a* (each time the scheduler engine performs an operation, it decides which event requires logging to be reapplied in case of restart, and logs essentially all the events that cause resources status change). In block 24 it is determined if the journaling repository 16*a* must be compacted/filtered (this can happen either after a certain amount of time, or when the repository size is greater than a specified size, or triggered by a command). If not, the process proceeds to block 21 to process a new event. Otherwise, in block 25 the merging engine 17 performs merge and compacting (pruning) operations on the journaling repository 16*a*. The steps of the process block 25 are described in more detail further below in relation to FIG. 4.

Figure 3:
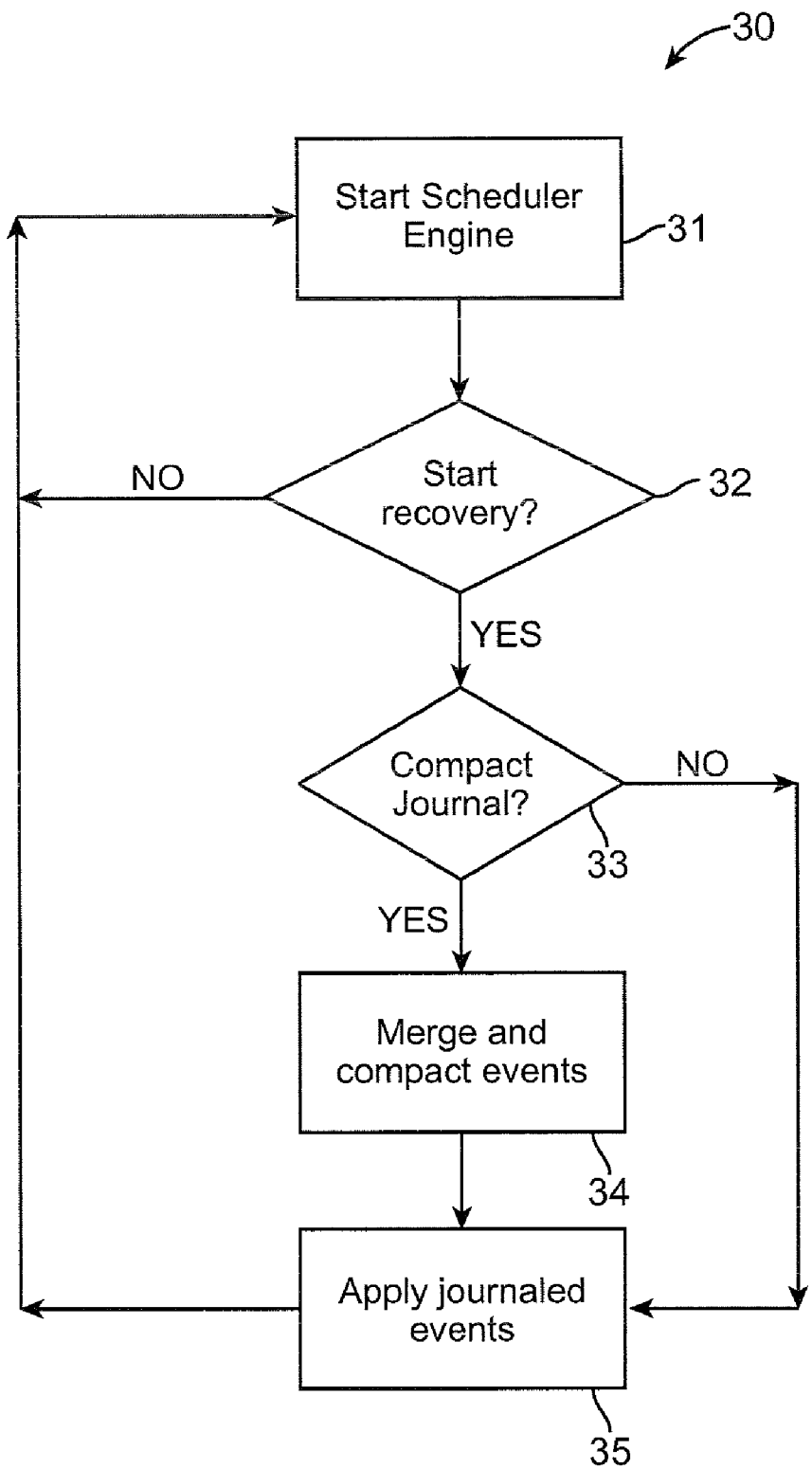
FIG. 3 shows a flowchart of a process for disaster recovery operations after a problem in the system of FIG. 1, according to an embodiment of the invention.

FIG. 3 shows a flowchart of a recovery (restart) activity process 30 for the system 10 using the journaling repository 16*a*, according to an embodiment of the invention. In processing block 31, the scheduler engine 13 is started for operation. In processing block 32, the scheduler engine checks if a recovery is required. If yes, the process proceeds to block 33, otherwise the process proceeds back to block 31. In block 33, the scheduler engine checks if the log journal must first be compacted (i.e., pruned). If so, the process proceeds to block 34, otherwise the process proceeds to block 35. In block 34, the events in the journaling repository 16*a* are analyzed and compacted/pruned. In block 35, the journaled events are reapplied to the system in order to recover the status before a failure/problem.

Figure 4:
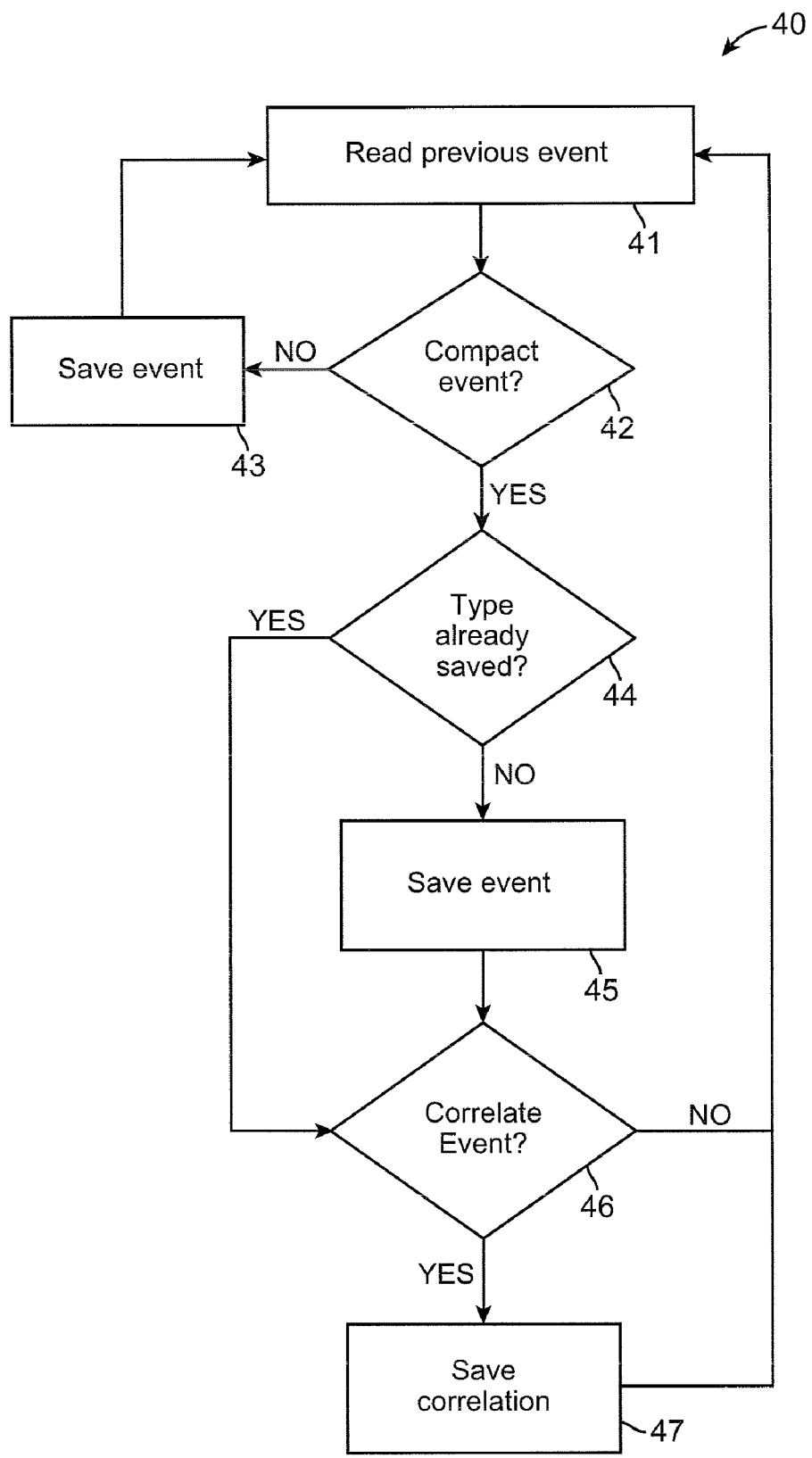
FIG. 4 shows a flowchart of a process for journaling events pruning in the system of FIG. 1, according to an embodiment of the invention.

FIG. 4 shows a flowchart of a merging and compacting process 40 for the journaling file 16 in the system 10, according to an embodiment of the invention. In block 41, events in the journaling repository 16*a* are read starting from a last event and proceeding backward. In block 42, the composition rule repository 18 is checked to determine if a read event can be compacted. If not, the process proceeds to block 43, otherwise the process proceeds to block 44. In block 43, as the event cannot be compacted it is saved to the journal 16*a* and the process proceeds to block 41 for processing the next event in the journal. The compacted log can be the same as the original log, or the compacted log can be a new different log used for restart, wherein in the latter case saving said event is required and in the former case saving the event is redundant since it already is present in the log. In block 44, as the event can be compacted, it is checked if an event of the same type has been saved to the journal 16*a* already (e.g., preferably a hash table is maintained in memory (built and updated during the log read operation); the hashing key being based on event type and resource names in order to facilitate the match and the search to improve performances; alternatively, different data storing and retrieval based on keys (e.g., using databases to store and retrieve the related matching records) can be used, and use of identification keys may be unnecessary when performing a sequential read of all the records until a match is found). If not, the process proceeds to block 45, else the process proceeds to block 46. In block 45 as the event has not been saved, it is saved to the journal 16*a*. In block 46, the composition rule repository 18 is checked to determine if the event must be correlated with one of the saved events (e.g., each event pertains to a certain category type and to a certain resource, wherein events of the same type (e.g., status change) belonging to the same category (e.g., linked event) for the same resource name (e.g., CPU name) are correlated based on the matching key information). If not, the process proceeds to block 41, otherwise the process proceeds to block 47. In block 47, as the event must be correlated with one of the saved events, the event is correlated with said one saved events and the correlation is saved (e.g., correlation involves a key defined for the event that can provide unique correlation between one event and another). Said read event and the event correlated with, are deleted from the log file. Generally, all unsaved events are discarded from the log file, thereby pruning the log file according to the above steps.

The restart engine is normally used at application restart time, the first time after RD, when it is requested to perform a recovery of the data. The restart engine can leverage on more restart data logged and organized in a more effective way according to the invention.

As is known to those skilled in the art, the aforementioned example embodiments described above, according to the present invention, can be implemented in many ways, such as program instructions for execution by a processor, as software modules, as computer program product on computer readable media, as logic circuits, as silicon wafers, as integrated circuits, as application specific integrated circuits, as firmware, etc. Though the present invention has been described with reference to certain versions thereof; however, other versions are possible. Therefore, the spirit and scope of the appended claims should not be limited to the description of the preferred versions contained herein.

The terms "computer program medium," "computer usable medium," and "computer readable medium", "computer program product," are used to generally refer to media such main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor multi-core processor to perform the features of the computer system. Accordingly, such computer programs represent controllers of the computer system.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for automated disaster recovery in an information technology computing system including computing resources, the method comprising:
   logging system events in a journaling log file;
   filtering the events of the log file for each resource and storing the filtered log file wherein filtering the events of the log file further includes,
      determining if the log file is to be filtered according to a criteria; if so, then performing merging and compacting on the log file, wherein performing merging and compacting on the log file includes,
         reading events from the log file starting from a last event and proceeding backwards, and
         checking in a composition rule repository to determine if a read event can be compacted, the composition rule repository including rules for compacting events,
         if the read event cannot be compacted, then saving the event,
         otherwise, if the read event can be compacted, then saving the event in the log file it has not been saved, and checking in the composition rule repository to determine if the read event is to be correlated with one of the saved events,
         if the read event is to be correlated, correlating the event with said one of the saved events, saving the correlated event in the log file and logically deleting said read event and said one of the saved events from the log file;
   reading the filtered log file; and
   restarting from a backup file by applying the filtered events to a backup file for recovery.

2. The method of claim 1 wherein filtering the events of the log file includes filtering the events of the log file for each resource into a set of complex events using a meta-event language.

3. The method of claim 1 wherein filtering the events of the log file includes pruning the log file by: creating a complex event from two or more simple events with event status connected with logical operators; creating complex events by processing prerequisites on different resources; and logically deleting said simple events.

4. The method of claim 1 wherein restarting further includes reapplying the log file events to the system in order to recover the status before a failure/problem.

5. The method of claim 1 wherein filtering the log file includes: using a meta-event language to identify a category of a logged event; and filtering the log file based on the event category, such that if an event is of a certain category, then maintaining a related complex event in the log file and pruning preceding events related to the said event from the log file.

6. An apparatus for automated disaster recovery in an information technology computing system including computing resources, the apparatus comprising:
   a hardware processor employing:
      a logging module configured for logging system events in a journaling log file;
      a compacting module configured for filtering the events of the log file for each resource and storing the filtered log file wherein the compacting module is further configured for
         filtering the events of the log file by determining if the log file is to be filtered according to a criteria and, if so, performing merging and compacting on the log file, and
         performing merging and compacting on the log file, wherein said performing merging and compacting on the log file comprises reading events from the log file starting from a last event and proceeding backwards, and
            checking in a composition rule repository to determine if a read event can be compacted, the composition rule repository including rules for compacting events,
            if the read event cannot be compacted, then saving the event,
            otherwise, if the read event can be compacted, then saving the event in the log file it has not been saved, and checking in the composition rule repository to determine if the read event is to be correlated with one of the saved events,
            if the read event is to be correlated, correlating the event with said one of the saved events, saving the correlated event in the log file and logically deleting said read event and said one of the saved events from the log file;
      a recovery module configured for reading the filtered log file, and restarting from a backup file by applying the filtered events to a backup file for recovery.

7. The apparatus of claim 6 wherein the compacting module is further configured for filtering the events of the log file for each resource into a set of complex events using a meta-event language.

8. The apparatus of claim 6 wherein the compacting module is further configured for filtering the events of the log file by pruning the log file, including: creating a complex event from two or more simple events with event status connected with logical operators; creating complex events by processing prerequisites on different resources; and logically deleting said simple events.

9. The apparatus of claim 6 wherein the recovery module is further configured for reapplying the log file events to the system in order to recover the status before a failure/problem.

10. The apparatus of claim 6 wherein the compacting module is further configured for filtering the log file by: using a meta-event language to identify a category of a logged event; and filtering the log file based on the event category, such that if an event is of a certain category, then maintaining a related complex event in the log file and pruning preceding events related to the said event from the log file.

11. A computer program product for automated disaster recovery in an information technology computing system including computing resources, comprising a non-transitory computer usable medium including a computer readable program comprising a plurality of instructions, wherein the instructions when executed on a computer cause the computer to:

maintain log of system events in a journaling log file;

compact the log file by filtering the events of the log file for each resource and storing the filtered log file wherein the instructions which cause the computer to compact the log file further include instructions which cause the computer to determine if the log file is to be filtered according to a criteria; if so, then to perform merging and compacting on the log file read events from the log file starting from a last event and proceeding backwards; check in a composition rule repository to determine if a read event can be compacted, the composition rule repository including rules for compacting events, if the read event cannot be compacted, then save the event, otherwise, if the read event can be compacted, then save the event in the log file it has not been saved, and check in the composition rule repository to determine if the read event is to be correlated with one of the saved events, if the read event is to be correlated, correlate the event with said one of the saved events, save the correlated event in the log file and logically delete said read event and said one of the saved events from the log file; and perform recovery by reading the filtered log file, and restarting from a backup file by applying the filtered events to a backup file for recovery.

12. The computer program product of claim 11 further including instructions to cause the computer to: filter the events of the log file for each resource into a set of complex events using a meta-event language, by: creating a complex event from two or more simple events with event status connected with logical operators; creating complex events by processing prerequisites on different resources; and logically deleting said simple events.

13. The computer program product of claim 11 wherein the instructions for compacting further include instructions for: using a meta-event language to identify a category of a logged event; and filtering the log file based on the event category, such that if an event is of a certain category, then maintaining a related complex event in the log file and pruning preceding events related to the said event from the log file.

14. The computer program product of claim 11 wherein the recovery instructions further include instructions for reapplying the log file events to the system in order to recover the status before a failure/problem.

\* \* \* \* \*